United States Patent
Tamura et al.

[11] Patent Number: 5,819,888
[45] Date of Patent: Oct. 13, 1998

[54] FRICTION PLATES FOR FRICTION TYPE COUPLING DEVICE

[75] Inventors: Hideki Tamura; Satoru Hiro, both of Ise, Japan

[73] Assignee: Shinko Denki Kabushiki Kaisha, Tokyo-to, Japan

[21] Appl. No.: 731,486

[22] Filed: Oct. 16, 1996

[30] Foreign Application Priority Data

Oct. 27, 1995 [JP] Japan .................................. 7-302214

[51] Int. Cl.⁶ .................................................. F16D 65/10
[52] U.S. Cl. ........................... 188/218 XL; 188/71.5; 192/107 R
[58] Field of Search ...................... 188/218 XL, 264 A, 188/264 AA, 71.5; 192/107 R, 107 M

[56] References Cited

U.S. PATENT DOCUMENTS

| | | | |
|---|---|---|---|
| 1,982,235 | 11/1934 | Shepherd | 188/218 XL |
| 2,533,480 | 12/1950 | Leininger et al. | 188/218 XL |
| 2,690,248 | 9/1954 | McDowall | 188/218 XL |
| 2,816,631 | 12/1957 | Butler | 188/218 XL |
| 3,231,058 | 1/1966 | Batchelor et al. | 188/218 XL |
| 3,734,256 | 5/1973 | Compton et al. | 188/218 XL X |
| 4,119,179 | 10/1978 | Masclet | 188/218 XL X |
| 4,156,479 | 5/1979 | Kawamura . | |
| 4,173,681 | 11/1979 | Durrieu et al. . | |
| 4,256,801 | 3/1981 | Chuluda . | |
| 4,286,694 | 9/1981 | Wiseman, Jr. et al. | 188/218 XL X |
| 5,036,368 | 7/1991 | Nakamura . | |
| 5,101,953 | 4/1992 | Payvar | 188/218 XL X |
| 5,148,902 | 9/1992 | Nakamura . | |
| 5,178,582 | 1/1993 | Maji et al. . | |
| 5,234,177 | 8/1993 | Maji et al. . | |
| 5,454,454 | 10/1995 | Easton et al. | 188/218 XL X |
| 5,515,953 | 5/1996 | Tamura et al. . | |

FOREIGN PATENT DOCUMENTS

WO/91/09234  6/1996  WIPO .............................. 188/218 XL

*Primary Examiner*—Peter M. Poon
*Attorney, Agent, or Firm*—Oblon, Spivak, McClelland, Maier & Neustadt, P.C.

[57] ABSTRACT

Friction plates for a friction type coupling device for displaying a function of braking, holding, accelerating or decelerating by depressing and contacting one friction member against the other friction member of a friction type coupling device composed of two friction plates one fabricated of metals or non-metallic materials or inorganic material. One friction plate has a friction portion which is selectively depressed against the other friction plate and a remaining non-contacting portion. The friction portion is formed as a plurality of protrusions by cutting away, by engraving a plurality of grooves, by cutting away non-contacting portions or by positively forming a plurality of protrusions on the surface of the friction plate. The area ratio of the friction potion to the whole area of the friction plate, namely the total of the contacting portion plus non-contacting portion is rendered less than 60%, preferably, less than 10%, whereby the variation of the generated friction force is made minimum and is able to keep stable friction performance.

18 Claims, 4 Drawing Sheets ized.

FRICTION PLATES FOR FRICTION TYPE COUPLING DEVICE

BACKGROUND OF THE INVENTION

1. Field of the Invention

The present invention generally relates to a friction type coupling device, and more particularly, to an improvement in the field of mechanically mating two elements using friction force, in which their generated friction force can be stabilized.

2. Description of the Prior Art

There are various kinds of friction type coupling devices such as, a friction brake in which both mating members are selectively depressed to be engaged with each other, thereby, these members function to brake, decelerate or release its braking force imparted to the other member, a friction clutch which transmits the motion of one friction element to the other, a torque limitter capable of preventing the coupling device from over-loaded state by letting mating members slip against each other when they are placed under an over-loaded state, and a tension brake which generates a certain amount of slip torque.

An electromagnetic friction brake is an example of these mechanical elements utilizing generated friction force as stated above, and it comprises a brake side disk at its braking side and a braked side disk at its braked side, respectively.

This kind of friction brake mentioned above functions to stop or to decelerate by urging the braking side disc against the braked side disk and letting both members engage with each other.

In order to make these mechanical elements utilizing friction to have higher quality level, several technical means for stabilizing their friction force are being developed and proposed.

As one of aforesaid prior art, Japanese Patent Laid-Open Publication No.Hei 5-141459, and Japanese Patent Laid-Open Publication No.Hei 5-87167 have been published as typical prior arts filed by the applicant, Shinko Denki Kabushild Kaisha.

The above-mentioned Japanese Laid-Open Publication No.Hei 5-141459 relates to a friction force transmitting device capable of being operative in a vacuum, in which a driven disc made of organic friction material is spline coupled through a hub to a rotary shaft of the driven side, while the other driving side disc is a friction element made either of a metallic material or of non-metallic material having a hardness equal to or higher than mild steel, wherein the surface roughness of either the metallic material or the non-metallic material having a hardness equal to or higher than mild steel is rendered coarser than that of the friction element fabricated of said organic material and thereby solved the problem that the friction force rapidly decreases after the device has been sliding motion in a vacuum for a certain distance.

The above-mentioned Japanese Laid-Open Publication No.Hei 5-87167 proposed the method of making the friction surface, provided on the surface of either one of the driving disk or on the driven disc, however, there was no concept between the ratio of variation of torque and the ratio of the area under friction to the total area of the friction plate.

As the other prior invention, there is, Japanese Laid-Open Patent Publication No.Hei5-296269, this relates to a full-disk type brake which aims to prevent vibration and noise in this type of brake.

Aforesaid invention solved the aforesaid problem by providing grooves 7b which passing across the friction surface 7a of the friction plate 7, as shown in FIG. 1, thereby friction wear powder formed during running can be caught by the groove 7b when they are moving on the friction surface 7a in circumferential direction and forced to travel along the groove 7b and then discharged outwards, and thus the aforesaid problems of vibration and wear can be obviated.

However, in this prior art too, there was no concept on the relation between the ratio of the area placed under friction to the total area of the friction plate.

When the prior art disclosed by the above-mentioned Japanese Laid-Open Patent Publication No.Hei 5-296269 is considered with the concept of the ratio of the area of the friction surface 7a to the total area of the friction plate 7, the total area of the groove 7b formed in the friction plate 7 was at most 30% of the entire area of the friction plate 7 or of the other disc.

In other words, area ratio of the friction contact portion 7a to the total area of the friction plate 7 is higher than 70%.

As stated above, there have been developed several arts which aim to stabilize friction force, for the purpose of levelling up the quality of the mechanical elements by utilizing friction force, however, there has been found no such prior art which has stabilized the friction force by using the technical concept of the area ratio of portion placed under friction to the total area of the friction plate.

Generally, a coefficient of friction does not have a fixed value, but it varies following the lapse of time during the use under friction, and therefore, in machinery utilising friction it is desired that such one having less secular change is preferred than that having a greater value.

And in this regard, it has long been desired that levelling up of the friction coupling device relying on the art of stabilizing its friction force.

SUMMARY OF THE INVENTION

An object of the present invention is to provide a set of friction plates comprising a braking side disk or disks and a braked side disk for constituting a friction coupling means having less extent of secular change.

Another object of the present invention is to stabilize the generated friction force.

Further object of the invention is to reduce, the ratio of the area under friction of the friction plate to the total area of the friction plate, to less than 60%, preferably, less than 10%.

Still a further object of the invention is to engrave or to cut a plurality of grooves or to provide a plurality of protrusions on the surface of the friction plate or plates.

The plate or plates provided with such protrusions can be used either as braking side disk(s) or as a braked side disks.

BRIEF DESCRIPTION OF THE DRAWINGS

These and other objects, features and advantages of the present invention may be readily asscertained by referring to the following description and appended drawings in which.

DETAILED DESCRIPTION OF THE PREFERRED EMBODIMENTS OF THE PRESENT INVENTION

Explanation will now be made hereunder on the preferred embodiments of the present invention shown in FIGS. 3A to 3F and FIGS. 4A to 4F and FIG. 5 of the appended drawings.

Figure 1:
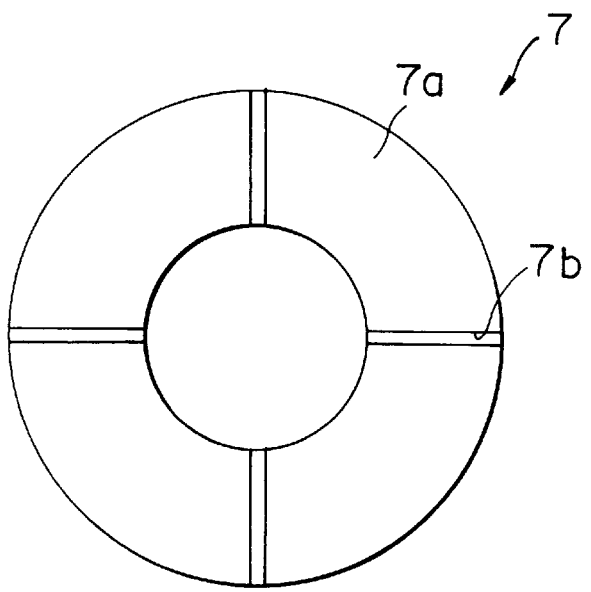
FIG. 1 is a plan view showing a friction plate shown in a prior art literature.
Figure 2:
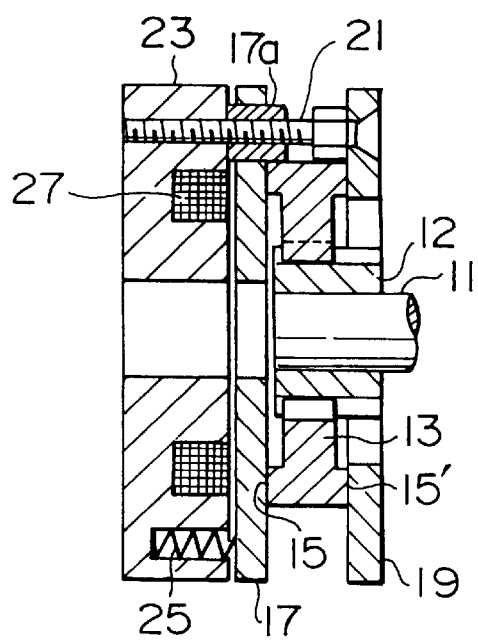
FIG. 2 is a brief side elevation of an electromagnetic friction brake of the present invention as well as that shown in another prior art literature.

These embodiments are those ones in which the present invention are applied to such conventional electromagnetic friction brake as shown in the aforesaid FIG. 2.

Before entering into the explanation on each embodiment of the invention, general construction of the electromagnetic friction brake will be explained by referring to FIG. 2.

An electromagnetic friction brake of this kind comprises braking side disks 17 and 19 and a braked side disk 13 mating with each other, and the portions placed under friction according to the present invention, can be provided on either one of the braking side and the braked side.

In the embodiments mentioned hereunder, the braked side disc 13 is spline coupled through a hub 12 around the rotating shaft 11 of the driven side.

The driven side disc 13 is fabricated of an organic friction material (polyimide type resinous material, phenol type resinous material, and a rubber type elastomeric material), inorganic fiction material, metals or surface treated material such as those prepared by spraying process, electron beam welding or by ion injection.

In this embodiment, the braked side disc 13 is formed to have braked faces 15 and 15', respectively on each end face.

On the other hand, a pair of braking disks 17 and 19 are disposed on the braking side so that the braked disc 13 can be sandwiched by these braking side disks 17 and 19.

Among these pair of braking side disks 17 and 19, braking side disk 19 is fixed by a screw member such as an adjusting bolt 21 to a base plate 23, which is tightly fixed to a stationary member, not shown.

While, the other braking side disc 17 is disposed being movable by sliding leftwards and rightwards around the outer surface of the collar 17a as shown in the drawing by sliding and is urged by a coil spring or springs 25 toward said braked side disc 13, and it can be moved leftwards in the drawing against the resilient force of the coil spring 25 when the electromagnetic coil 27 is energized.

When the electromagnetic coil 27 is not energized, the pair of braking side disks 17 and 19 are urged by the coil spring 25 towards the braked side faces 15 and 15' of the braked side disk 13 so as to be engaged therewith, so the desired braking function can be attained and the further rotation of the driven side can be restricted.

When the electromagnetic coil 27 is energized, the other braking side disk 17 moves away from the face 15 of the braked side disk 13 against the resilient force of the coil spring 25, consequently, the braking action is stopped to allow the shaft 11 of the braked side to rotate.

Aforesaid braking side disks 17 and 19 are fabricated of metallic material, for example, mild steel, austenitic stainless steel, aluminum and its alloys, titanium, other various surface treated steel, organic friction material or nonmetallic materials.

Explanation will next be made with reference to FIGS. 3A to 3F and FIGS. 4A to 4 on the configuration of one of the pair of braking side disk 17, selected as a friction face in the embodiment of the present invention.

FIGS. 3A to 3F respectively, is a plan view of the each embodiment of the present invention, and FIGS. 4A to 4F, respectively, is a cross sectional view showing a friction portion and the contiguously formed noncontact area.

Figure 3A:
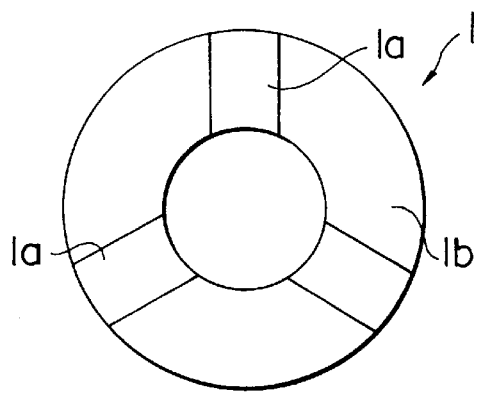
FIGS. 3A to 3F, respectively, is a plan view of friction plate each provided with a number of friction contact protrusions according to the present invention.

FIG. 3A is a plan view, for example, of a friction plate 1 fabricated of nickel plated pure iron selected as a sliding side disk in combination with a braked side disk (not shown) fabricated of polyimede.

The friction plate 1 has a shape of a hollow annular ring, the surface of which is formed with three sector shaped recessed portions 16 of nickel plated pure iron, thereby there are formed three protrusions 1a each acting as friction portions extending radially and having a rectangular shape in plan view.

Figure 4A:
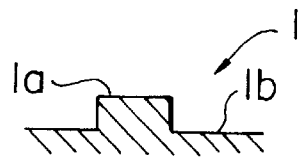
FIGS. 4A to 4F, respectively, is an enlarged partial cross sectional brief view of the friction plate corresponding to FIGS. 3A to 3F and, FIG. 5 is a graph showing a relation between the area ratio (ratio in area) of the friction portions of the present invention to the total area of the friction plate and the ratio of variation of the generated friction force.

FIG. 4a is a cross sectional view showing the formed protrusions 1a in enlarged scale each acting as friction contacting portion extending radially and having almost a rectangular shape in plan view and 1b is a recessed portion formed by protrusion 1a.

Figure 3B:
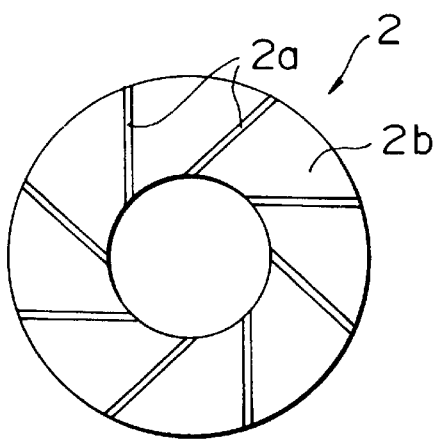

FIG. 3B is a plan view, similarly of a friction plate 2 fabricated of nickel plated pure iron selected as a braking sliding side disk in combination with a braked side disk (not shown) fabricated of polyimede.

The friction plate 2 has a shape of a hollow annular ring, the surface of which is formed with eight deformed sector shaped recessed portions 2b of nickel plated pure iron, thereby there are formed eight protrusions 2a each acting as friction portions extending spirally and having a thin ridge-like shape in plan view.

Figure 4B:
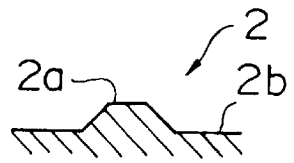

FIG. 4B is an enlarged cross sectional view of a protrusion 2a and a recessed portion 2b.

Figure 3C:
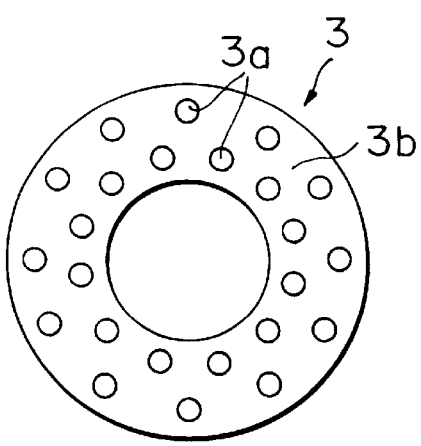
Figure 4C:
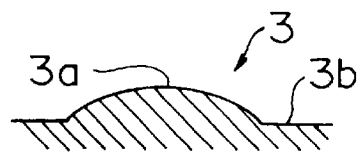

FIG. 3C shows also a hollow annular ring as a friction plate 3 provided with a number of lenticular protrusions 3a uniformly distributed (dispersed) on the surface of the friction plate 3, thereby there formed non contacting base portion 3b acting as non-friction portion of the friction plate. FIG. 4C is an enlarged cross sectional view of FIG. 3C.

Figure 3D:
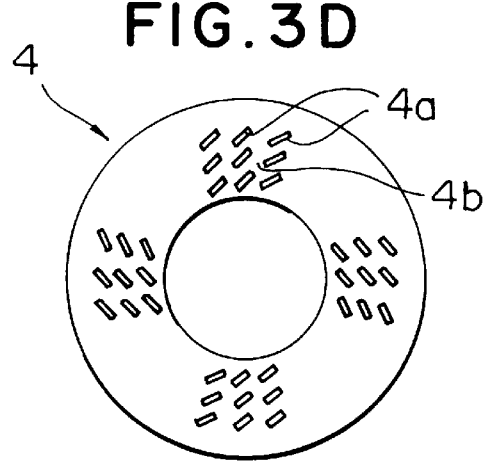

FIG. 3D is a plan view of a friction plate 4 of nickel plated pure iron being used in combination with a friction plate of braked disk (not shown) made of polyimide resin.

Figure 4D:
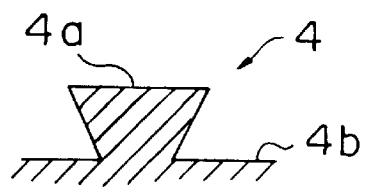

The friction disk 4 has a cross section of a hollow annular ring, the surface of which is formed with a plurality of protruded friction portions 4a each having an inverted truncated parallelogram shape as shown in FIG. 4D and being distributed on the surface of the friction plate 4, and 4b is a non contacting region formed by these protrusions.

Figure 3E:
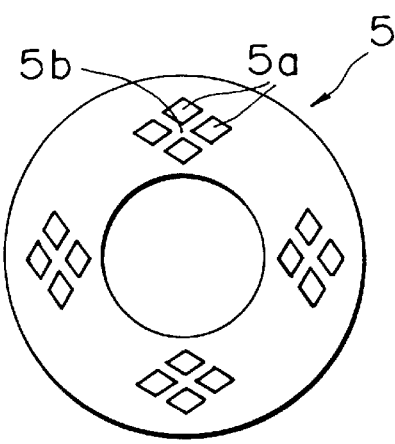
Figure 4E:
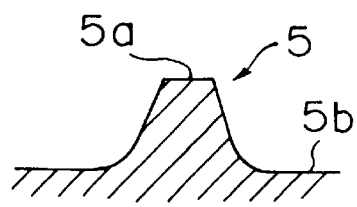

FIG. 3E, similarly is a plan view of a friction plate 5, and this device using nickel plated pure iron as braking side disks and a polyimide resinous made plate as braked side disk (not shown) in combination, wherein the upper face of the friction plate 5 has a plurality of protrusions 5a each having a flat top of rhombus shaped plane and the side faces of which become wider toward its bottom as shown in the partial cross sectional view FIG. 4E in enlaged scale. and numeral 5b is a non-engaging region formed by these protrusions 5a.

Figure 3F:
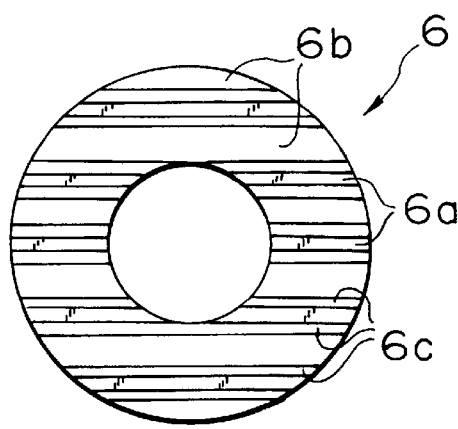

FIG. 3F, similarly, is a plan view of a friction plate 6 of nickel plated pure iron which uses a braked side disc made of polyimides (not shown) in combination, and the friction plate 6 has a number of projections 6a each defined by a top flat face 6a' and convex faces 6d on both sides, the lower ends of which are defined by two segments of line, including or not including diameter and other segment of lines cut by the inner ring 6r of the plate 6 and the other segments of line parallel to the diameter 6d and not separated by the inner ring 6r and each forms a chord of the circle.

Figure 4F:
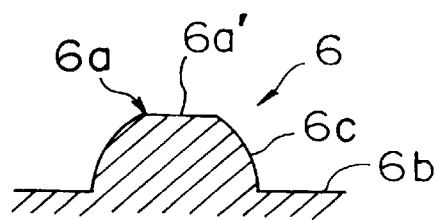

And each of these protrusions 6a has a flat face 6a' and two side convexed face 6c becoming wider toward the bottom, and numeral 6b is a region of non contact defined by these protrusions 6a. FIG. 4F is a partial cross sectional enlarged view of the friction plate of FIG. 3F.

Friction portions shown in FIGS. 3A to 3F as plan view can be used selectively in combination with the cross section configurations shown in FIGS. 4A to 4F.

Gross area of these friction portions can be made less than 60% of the total area of the friction plate 1 through 6, preferably less than 10% so as to make the ratio of variation of friction force (coefficient of friction) as small as possible.

Figure 5:
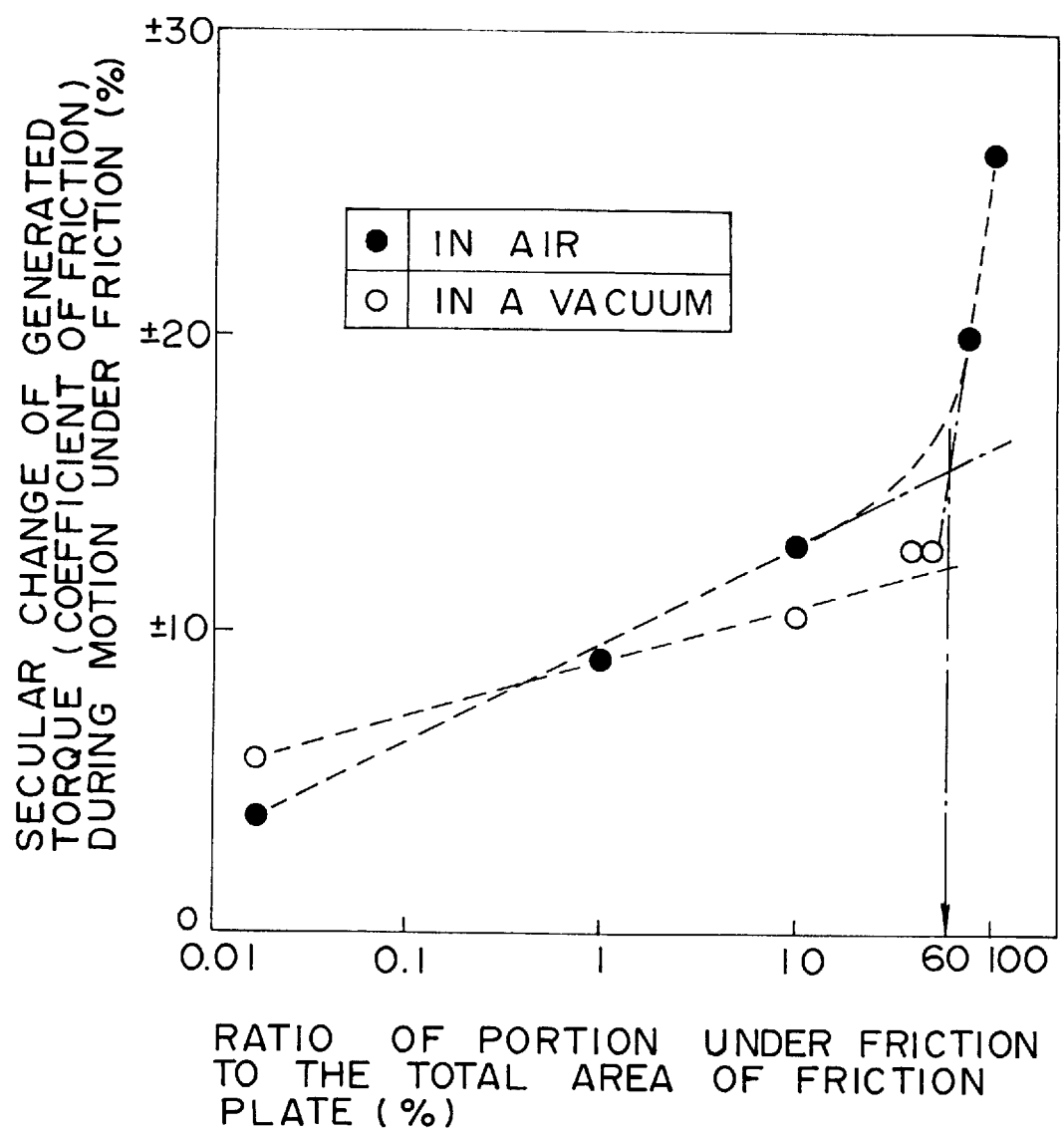

The result obtained by the above-mentioned construction is shown in FIG. 5.

FIG. 5 is a graph showing the result of the observation conducted to know the variation of the generated friction force both in air and in a vacuum, the obtained results are shown by placing the secular variation of the generated friction force (coefficient of friction) during the period of observation in ordinates, and the ratio of friction (contacting) portion to the total area of the friction plate in abscissa in logarithmic scale.

It is observed from this curve that there is an inflection point at the ratio of 60%, and in the region less than the ratio of 10%, the curve is changed into a straight line, which indicates that the generated torque is made stabled under this point.

Moreover, FIG. 5 shows the results of the experiments conducted down to 0.01%, however, it is considered that the same characteristic would be shown, even at the point 0.001% or at 0.0001%.

It is considered that this distinguishable feature is brought about by the fact that friction wear dust or wear powder formed between two mating friction plates is allowed to be ejected to the non-contacting region, thereby some factors which affect the variation of friction force, can be decreased.

Accordingly, the present invention, by virtue of enabling the ratio of the area of friction portion to the total area of friction plate less than 60%, preferably less than 10% and thereby causing the ratio of variation of friction to be less and make the friction force more stable, and this reduces the variation ratio of generated torque and thus makes it stable not only in air but also in a vacuum.

In applying the present invention to actual machinery or devices, when the stress applied to each friction portion exceeds the braking strength, it is necessary to increase the area ratio of the friction portion, namely to increase the size of each individual protrusion more larger or to increase the number of protruded friction portion.

On the other hand, when it is intended for use in a vacuum to brake a rotating body of low rotating speed, or to transmit the motion of these kind of rotating body to other members subjected to friction, it is desired that the total area of such friction plate is made as large as possible and thereby to reduce the area ratio of the friction portion to its lower limit, for example 0.01%, however, it is to be noted in making the total area of friction plate larger, not only the size of the friction plate itself but also the volume of the housing for receiving the friction plate must be taken into account.

As stated above, the present invention has been made by taking the concept of the area ratio of the portion under friction of the friction plate to the total area of friction into consideration, moreover, the environment in which the present invention is used is not limited to air, in a vacuum or in space, but it may be used in such a particular atmosphere as in helium or nitrogen.

In addition, the configurations of the portion under friction is not restricted to those embodiments shown in FIGS. 3A to 3F and FIGS. 4A to 4F, and further these embodiments are explained as friction type brake, but the present invention can be applied to many other means such as electromagnetic friction clutch, torque limitter, tension brake and other driving means and electrically operated motion means such as friction drive means.

Since the present invention has been proposed by taking the concept of area ratio of the portion under friction to the total area of the friction plate into account, the present invention is especially appropriate for use in dry electromagnetic clutches and ordinary friction clutches utilizing the resilient force of spring(s) or the magnetic force of the permanent magnet(s).

As to the shape or configuration of the friction element, it is not limitted to the circular disks as shown in the appended drawings, and it can take a form of a drum shaped disk or a shape of brake shoe(s).

Excepting the embodiment shown in FIG. 4C, the top faces shown in FIGS. 4A, 4B, 4D, 4E and 4F are shaped flat, however, the present invention is not restricted to such flat top protrusions and they can be formed as lenticular convexed top face with similar performance.

As stated in detail in the foregoing explanation, since the friction force transmitting device of the present invention have been constructed to satisfy the ratio of the area under contact of the protrusion, namely, the ratio of the area under frictional contact to the total area of the friction plate or disk is rendered less than 60%, preferably less than 10%, the present invention can accomplish many meritorious effects as follows;

1) Both in air and in a vacuum, the variation ratio of the generated friction can be reduced and thus stabilizes the friction force.
2) As a consequence, it is very remarkable that the friction force transmitting device of the present invention can be suitably applicable to machinery or devices in air, in a vacuum or space, for example, a brake for holding or stopping the joint of a manipulator(s) in a space station, or tension brakes or a torque emitters requiring stable slip force and the actual meritorious effects can be brought about by this invention.
3) Friction wear powder formed between mating friction plate can be readily exhausted, thereby factors which affect the variation in the friction force attributable to these friction wear powder can be reduced, thereby the friction force generated by the device can be made stable.

The present invention has been described in detail, it should be understood that various changes, substitutions and alternations can be made hereto without departing from the spirit and scope of the present invention as defined by the appended claims.

What is claimed is:

1. Friction plates for a friction type coupling comprising at least one braking side friction member and a braked side friction member having friction faces to be urged against each other, wherein one of said friction members comprises a friction face with a friction portion which is placed in contact with the other of said friction members when said friction portions are urged against each other and a non-contacting portion, said friction portion comprising a plurality of protrusions such that the area ratio of the total of said friction portion to the total sum of areas of said friction portion and said non-contacting portion is less than about 60%.

2. Friction plates as claimed in claim 1, in which the area ratio is less than 10%.

3. Friction plates as claimed in claim 1, including two of said braking side members between which said braked side member is sandwiched.

4. Friction plates as claimed in claim 1, in which said one friction member is a braked side disk having at least one end face formed to have said protrusions.

5. Friction plates as claimed in one of claim 1 through claim 4, in which the shape of each of the friction members is a hollow circular cylinder.

6. Friction plates as claimed in claim 1, in which one of said friction member takes the shape of a brake shoe.

7. Friction plates as claimed in claim 1, in which the friction plate are used for an electromagnetic clutch/brake.

8. Friction plates as claimed in claim 1, in which the friction plates are applied to a torque limitter means.

9. Friction plate or plates as claimed in claim 1, in which the friction plates are applied to a tension brake means.

10. Friction plates as claimed in claim 1, in which the friction plates are applied to a friction drive means.

11. Friction plates as claimed in claim 1, in which said protrusions are formed by removing the non-contacting portion away from the surface of the friction plate.

12. Friction plates as claimed in claim 11, in which said protrusions are formed by removing the non-contacting portion by forming a plurality of recessed sectors.

13. Friction plates as claimed in claim 11, in which said protrusions are formed by applying desired material on the surface of the friction plate by way of electron beam welding or by ion injection.

14. Friction plates as claimed in claim 11, in which said protrusions are formed by making a plurality of grooves on the surface of the friction member.

15. Friction plates as claimed in claim 1, wherein each of said plurality of friction protrusions has an approximately rectangular shape.

16. Friction plates as claimed in claim 1, wherein each of said friction protrusions defines a shape which is selected from a group consisting of a rectangular shape, a thin ridge-like shape, a lenticular shape, an inverted truncated shape, a flat top face defined by raised concaved side faces, and a flat top face defined by raised convex side faces in cross section.

17. Friction plates as claimed in claim 1, wherein each of said friction protrusions defines a cross-sectional shape which is selected from a group consisting of a rectangular shape, a thin ridge-like shape, a lenticular shape, an inverted truncated shape, a flat top face defined by raised concaved side faces, and a flat top face defined by raised convexed side faces, each of which is selected in combination with a plan shape selected from a group consisting of a rectangular shape, a thin ridge-like shape, a lenticular shape, an inverted truncated shape, a flat top face defined by concaved side faces and a flat top face defined by raised convexed side faces.

18. Friction plates for a friction type coupling means comprising at least one braking side friction member and a braked side friction member to be urged against each other for holding, braking, or decelerating, wherein;

said at least one braking side friction member comprises a contacting part which can be placed under contact with the braked side friction member and a non-contacting part, said contacting part comprising a plurality of protruding means which frictionally contact the braked side friction member, an area ratio of a total of said contacting part to a total sum of said contacting part and said non-contacting part is less than 60%, so as to a apply a stable friction force.

* * * * *